Patented July 3, 1951

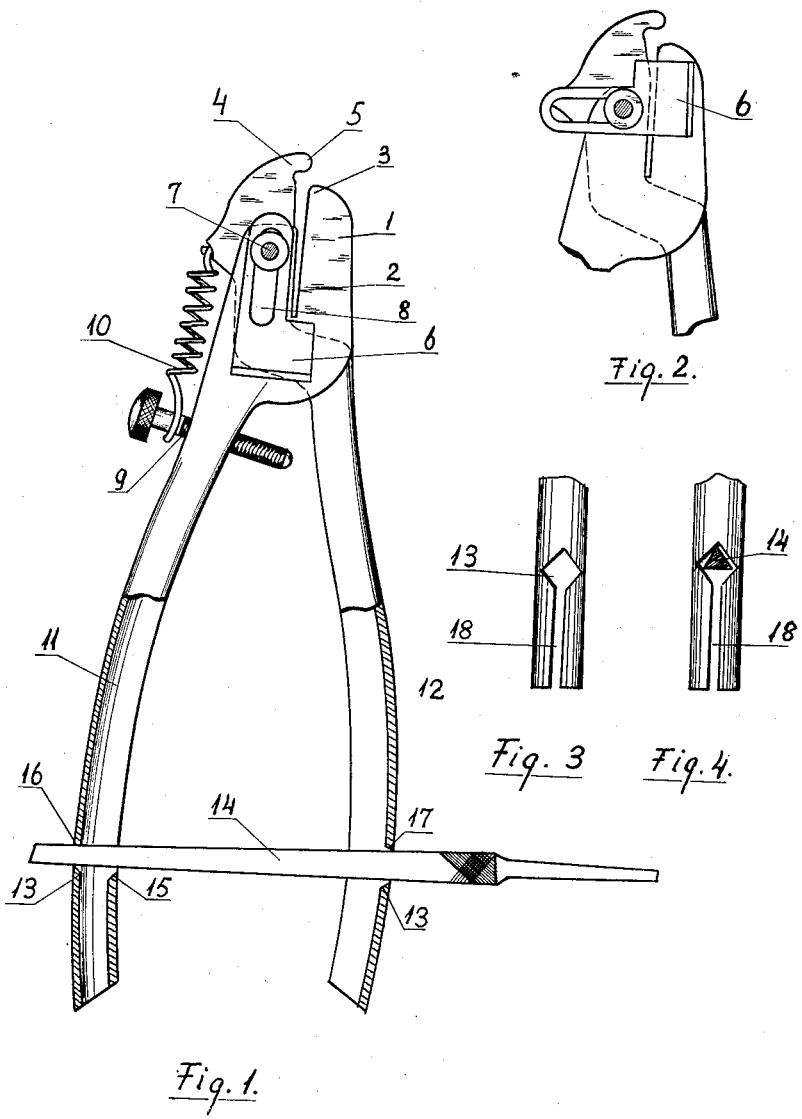

2,559,359

UNITED STATES PATENT OFFICE 2,559,359

SAW SET FOR BUCKSAW BLADES

Erkki Aapeli Hyvonen, Helsinki, Finland

Application November 14, 1947, Serial No. 786,043
In Finland December 14, 1946

3 Claims. (Cl. 76—64)

This invention relates to an improved saw set designed for use with bucksaw blades, and one of its objects is to provide a saw set comprising a pair of pivoted handles, said handles having a slot in the jaw for supporting the saw blade, while the other jaw bends the respective saw-tooth to the side, the said slot being as deep as the saw blade is broad so that the tooth stays outside the edge of the supporting jaw, when the saw is inserted into the opening back foremost, and that the jaw which acts upon the saw-tooth is longer than the supporting jaw, passing by it as far as to the tooth, when the saw blade is placed into the supporting jaw.

With the above and other objects in view the invention relates to certain new and useful combinations, constructions, and arrangements of parts, clearly described in the following specification, and fully illustrated in the accompanying drawings, in which: Fig. 1 is a side view of the saw set. Fig. 2 is a view of the jaw part of the saw set, whereby a gage 6 belonging to the set is turned into another position than in Fig. 1. Fig. 3 and Fig. 4 are views of the ends of the handles seen from the narrow side of the saw set.

In one of the jaws 1 of the saw set there is a slot 2 as deep as the width of the saw blade. The saw blade is placed in this slot back foremost in such a manner that the respective tooth stays outside the edge 3. When the saw set is pressed together, the point 5 of the jaw 4 bends the saw tooth to the side at the required angle. The bend occurs at the base of the tooth.

An adjustable gage 6 is fixed to the jaw 1 by a screw 7. Due to a long slot 8 the gage can be moved and fixed at a place, where it supports the back of the saw blade in such a manner that each tooth will be bent accurately in the same way, the setting thus becoming very even.

In Fig. 2 the gage 6 is turned crosswise. Thus disposed the saw set is suitable for setting of very narrow saw-blades, for instance band-saw blades. By an adjusting screw 9 the closing movement of the jaws is regulated in such a manner, that the teeth are bent to the desired degree. According to the invention it is further possible to cut off the small jags, appearing between the teeth at the setting, by adjusting the jaws so as to catch sharp together. At the end of the handles 11 and 12 openings 13 have been made, the form of which is best seen in Fig. 3. The file 14 is shown in Figs. 1 and 4 stuck into these holes. When the handles 11 and 12 are further away from one another the file is able to move freely in the holes, but when the handles are pressed together, the point 15 inside the handle 11 presses or lifts the file up against the upper edge 16 of the hole, simultaneously endeavoring to turn the file against the upper edge 17 of the hole 13 in the other handle 12. In this manner the file will be firmly locked in its place.

Slots 18, of the same width as the thickness of the saw blade pass from the end of the handles to the holes 13. On account of the form of the holes 13 there is a suitable space for the saw teeth under the file 14, even in case the teeth should have been bent too much to the side at the setting.

The saw teeth are made even by placing the saw blade into the slots 8 in the said handles, the teeth against the file, and then pulling the device against the saw blade.

According to the invention it is possible, due to the saw set, comfortably and rapidly to execute the setting without damaging the saw teeth in any manner. All the teeth are bent in the same degree thus making the setting very even. According to the invention the saw set also offers the advantage that the saw tooth always can be bent exactly as much as the working conditions require in every separate case. This quality is of importance, since dry wood requires less setting than damp wood, while frozen wood requires still less. Besides this each kind of tree requires its specific setting, which fact often forces the sawyer to change (reduce or increase) the setting angle even in the midst of the work dependent on the qualities of the wood.

In case one, by some reason, interrupts the setting work and releases the grip around the handles of the saw set, the spring contracts, and the back part of the upper jaw is pressed against the back of the saw blade in such a manner that the saw set is prevented from gliding, and thus stays as a mark of how far the setting has already been executed.

Since the saw blade is inserted back first into the saw set, the most important part of the tooth, its point, cannot come into contact with iron nor be damaged thereby.

Besides setting the saw blade, and cutting off the above mentioned small jags, one is, according to the invention, also able to split the saw blade in the following manner.

A line along the saw blade is drawn by the aid of the point of a file. The saw blade is then pushed in between the jaws of the saw set to a depth corresponding to the above mentioned line, and now, pressing the handles of the saw set together, the blade is broken in two. Such splitting of the saw blade is done particularly in the spring, when a broad blade has a strong tendency to stick in the tree in consequence of the high degree of rosin in the wood.

My improved saw set offers the advantage of the workman being able to set a bucksaw blade at any place, be it in a shop or a factory, or out of doors. It is understood that various changes in the details of construction, combination and arrangement of parts, within the scope of the invention as defined by the claims, may be resorted to.

I claim:

1. A manually operated saw set, including a first handle terminating in a supporting jaw having a slot provided with outer and inner ends and being open at the outer end thereof for supporting a saw blade and dividing the supporting jaw into a main jaw portion and a relatively smaller jaw portion, said main jaw portion having an outer end; a second handle terminating in a setting jaw having an outer end and extending a predetermined distance beyond the outer end of the main jaw portion, said setting jaw being pivoted to the relatively shorter jaw portion upon the first handle at a point intermediate the outer and inner ends of the slot in the supporting jaw in order to allow the handles to pivot about an axis transverse thereto, the depth of the slot with respect to the length of said main jaw portion corresponding to the width of the saw blade to be set when seated in said slot with the teeth thereof projecting beyond the outer end of said main jaw portion; and an integral setting projection upon the outer end of said setting jaw spaced a predetermined distance beyond the outer end of said main jaw portion and extending transversely of said slot in closed position of said handles and jaws in effective position to bend and thereby set a saw tooth upon the seated saw blade to one side.

2. A manually operated saw set, including a first handle terminating in a supporting jaw having a slot provided with outer and inner ends and being open at the outer end thereof for supporting a saw blade and dividing the supporting jaw into a main jaw portion and a relatively smaller jaw portion, said main jaw portion having an outer end; a second handle terminating in a setting jaw having an outer end and extending a predetermined distance beyond the outer end of the main jaw portion, said setting jaw being pivoted to the relatively shorter jaw portion upon the first handle at a point intermediate the outer and inner ends of the slot in the supporting jaw in order to allow the handles to pivot about an axis transverse thereto; a gage adjustably mounted upon the side of the supporting jaw for determining the extent of the slot with respect to the length of said jaw portion to correspond to the width of the saw blade to be set when seated in said slot with the teeth thereof projecting beyond the outer end of said main jaw portion; a set screw extending adjustably through said gage into said main jaw portion in parallelism to the pivot axis of said handles for securing said gage in selected positions on said jaw portion; and an integral setting projection upon the outer end of said setting jaw spaced a predetermined distance beyond the outer end of said main jaw portion and extending transversely of said slot in closed position of said handles and jaws in effective position to bend and thereby set a saw tooth upon the seated saw blade to one side.

3. A manually operated saw set, including a first handle terminating in a supporting jaw having a slot provided with outer and inner ends and being open at the outer end thereof for supporting a saw blade and dividing the supporting jaw into a main jaw portion and a relatively smaller jaw portion, said main jaw portion having an outer end; a second handle terminating in a setting jaw having an outer end and extending a predetermined distance beyond the outer end of the main jaw portion, said setting jaw being pivoted to the relatively shorter jaw portion upon the first handle at a point intermediate the outer and inner ends of the slot in the supporting jaw in order to allow the handles to pivot about an axis transverse thereto; a gage adjustably mounted upon the side of the supporting jaw for determining the extent of the slot with respect to the length of said jaw portion to correspond to the width of the saw blade to be set when seated in said slot with the teeth thereof projecting beyond the outer end of said main jaw portion; a set screw extending adjustably through said gage into said main jaw portion in parallelism to the pivot axis of said handles for securing said gage in selected positions on said jaw portion; an adjusting screw extending through the first handle to a variable distance toward the other handle at a predetermined distance from the pivot mounting of the handles for adjusting the degree of setting to be effected by said saw set; an attaching projection upon the setting jaw disposed on the outer non-operating side thereof remote from the supporting jaw; a tension spring connected at one end to the adjusting screw and at the other end to said attaching projecting in order to bias the handles and jaws apart; and an integral setting projection upon the outer end of said setting jaw spaced a predetermined distance beyond the outer end of said main jaw portion and extending transversely of said slot in closed position of said handles and jaws in effective position to bend and thereby set a saw tooth upon the seated saw blade to one side.

ERKKI AAPELI HYVONEN.

REFERENCES CITED

The following references are of record in the file of this patent:

UNITED STATES PATENTS

| Number | Name | Date |
|---|---|---|
| 323,005 | Wheeler | July 28, 1885 |
| 655,823 | Dougald | Aug. 14, 1900 |
| 944,391 | Taylor | Dec. 28, 1909 |
| 1,111,348 | Andersen | Sept. 22, 1914 |
| 1,131,105 | Ballard | Mar. 9, 1915 |
| 2,053,639 | Sjodin | Sept. 8, 1936 |
| 2,223,266 | Nicholas | Nov. 26, 1940 |
| 2,401,264 | Murray | May 28, 1946 |

FOREIGN PATENTS

| Number | Country | Date |
|---|---|---|
| 10,596 | Great Britain | 1884 |
| 749,976 | France | May 15, 1933 |